US012532082B2

(12) United States Patent
Liao (10) Patent No.: US 12,532,082 B2
(45) Date of Patent: Jan. 20, 2026

(54) IMAGE CAPTURING MODULE INCLUDING COLOR CHANGE ASSEMBLY

(71) Applicant: Chicony Electronics Co., Ltd., New Taipei (TW)

(72) Inventor: Chih-Liang Liao, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 200 days.

(21) Appl. No.: 18/448,986

(22) Filed: Aug. 14, 2023

(65) Prior Publication Data

US 2024/0414447 A1  Dec. 12, 2024

(30) Foreign Application Priority Data

Jun. 7, 2023 (TW) ................................ 112121326

(51) Int. Cl.
*H04N 23/84* (2023.01)
*H04N 1/60* (2006.01)
*H04N 23/60* (2023.01)

(52) U.S. Cl.
CPC ............. *H04N 23/84* (2023.01); *H04N 1/603* (2013.01); *H04N 23/60* (2023.01)

(58) Field of Classification Search
CPC ........ H04N 23/84; H04N 1/603; H04N 23/60; H04N 23/55; H04N 23/74; H04N 23/51
See application file for complete search history.

(56) References Cited

U.S. PATENT DOCUMENTS

| | | | | |
|---|---|---|---|---|
| 7,224,394 | B2 * | 5/2007 | Shimamura | H04M 1/0245 348/335 |
| 8,797,451 | B2 * | 8/2014 | Bilbrey | H04N 7/142 348/335 |
| 10,397,490 | B2 * | 8/2019 | Dorai | H04N 23/56 |
| 11,719,991 | B2 * | 8/2023 | Liu | H04N 23/60 348/362 |
| 11,806,904 | B2 * | 11/2023 | Sørensen | A61B 1/0684 |
| 12,182,916 | B2 * | 12/2024 | Armstrong-Muntner | H04N 23/611 |
| 2003/0125008 | A1 * | 7/2003 | Shimamura | H04M 1/72403 455/344 |

(Continued)

FOREIGN PATENT DOCUMENTS

| | | |
|---|---|---|
| CN | 216351654 | 4/2022 |
| TW | 201444362 | 11/2014 |

OTHER PUBLICATIONS

"Office Action of Taiwan Counterpart Application", issued on Jul. 16, 2024, p. 1-p. 7.

*Primary Examiner* — Chiawei Chen
(74) *Attorney, Agent, or Firm* — JCIPRNET (57) ABSTRACT

An imaging capturing module includes an appearance member, an image capturing unit, a color change assembly, and a control unit. The appearance member has an opening. The image capturing unit is disposed on an inner side of the appearance member and corresponds to the opening. The color change assembly covers the opening. The control unit is coupled to the color change assembly and is adapted to control the color change assembly to change to a first color and a second color. When the color change assembly is the first color, the control unit controls the image capturing unit to turn on. When the color change assembly is the second color, the control unit controls the image capturing unit to turn off.

14 Claims, 4 Drawing Sheets

(56) References Cited

U.S. PATENT DOCUMENTS

| | | | |
|---|---|---|---|
| 2008/0080850 A1* | 4/2008 | Amirzadeh | G03B 15/03 396/155 |
| 2008/0304819 A1* | 12/2008 | Tolbert | G03B 17/18 396/448 |
| 2013/0050549 A1* | 2/2013 | Bilbrey | G06F 1/1605 348/E5.026 |
| 2014/0267874 A1* | 9/2014 | Ratcliff | G06F 1/1686 348/335 |
| 2016/0241733 A1* | 8/2016 | Wilsher | H04N 1/02865 |
| 2019/0174048 A1* | 6/2019 | Dorai | H05B 45/48 |
| 2021/0200294 A1* | 7/2021 | Tam | G06F 1/325 |
| 2021/0405494 A1* | 12/2021 | Liu | H04N 23/60 |
| 2022/0197110 A1* | 6/2022 | Li | G06F 1/3287 |
| 2022/0321747 A1* | 10/2022 | Hou | H04N 23/55 |
| 2023/0421883 A1* | 12/2023 | Luo | H04N 23/74 |
| 2024/0104814 A1* | 3/2024 | Armstrong-Muntner | H04N 23/74 |

* cited by examiner

IMAGE CAPTURING MODULE INCLUDING COLOR CHANGE ASSEMBLY

CROSS-REFERENCE TO RELATED APPLICATION

This application claims the priority benefit of Taiwan application serial no. 112121326, filed on Jun. 7, 2023. The entirety of the above-mentioned patent application is hereby incorporated by reference herein and made a part of this specification.

BACKGROUND

Technical Field

The disclosure relates to an image capturing module; more particularly, the disclosure relates to an image capturing module adapted to an electronic device.

Description of Related Art

In recent years, consumer electronic devices, such as laptops, mobile phones, or tablet computers, have become increasing equipped with camera lenses. These lenses allow users to capture images through the camera lenses for various image applications (e.g., conducting videoconferences). However, a common issue arises where the users are unable to determine whether the camera lenses are actively operating based solely on the appearance of the electronic devices. This lack of visual cues may result in unintentional image capture by the camera lenses and potential privacy breaches, as the images of the users may be unintentionally leaked.

SUMMARY

This disclosure provides an image capturing module, which may help users effectively learn an operational status of an image capturing unit.

In an embodiment of the disclosure, an image capturing module including an appearance member, an image capturing unit, a color change assembly, and a control unit is provided. The appearance member has an opening. The image capturing unit is disposed on an inner side of the appearance member and corresponds to the opening. The color change assembly covers the opening. The control unit is coupled to the color change assembly and adapted to control the color change assembly to change to a first color and a second color. When the color change assembly is the first color, the control unit controls the image capturing unit to turn on, and when the color change assembly is the second color, the control unit controls the image capturing unit to turn off.

According to an embodiment of the disclosure, the first color is a transparent color, and the second color is an opaque color.

According to an embodiment of the disclosure, the second color is identical to a color of the appearance member.

According to an embodiment of the disclosure, the second color is different from a color of the appearance member.

According to an embodiment of the disclosure, the color change assembly includes a light guide plate and at least one light source, and the at least one light source faces the light guide plate and is adapted to change a color of the light guide plate.

According to an embodiment of the disclosure, the at least one light source includes a plurality of light sources symmetrically surrounding the image capturing unit.

According to an embodiment of the disclosure, the color change assembly includes an e-ink assembly.

According to an embodiment of the disclosure, the image capturing module further includes a substrate, where the image capturing unit and the color change assembly are disposed at the substrate.

According to an embodiment of the disclosure, the color change assembly includes a light guide plate, and the light guide plate is planar and corresponds to the opening.

According to an embodiment of the disclosure, the color change assembly includes a light guide plate. The light guide plate includes a main body portion, an extension portion, and a connection portion. The main body portion corresponds to the opening and is parallel to the appearance member, the extension portion extends between the main body portion and the connection portion, and the connection portion is connected to the substrate.

According to an embodiment of the disclosure, the color change assembly further includes at least one light source. The connection portion has a step shape to form an accommodation space, and the at least one light source is disposed within the accommodation space.

According to an embodiment of the disclosure, the image capturing module further includes a bracket, where the color change assembly is disposed at the substrate through the bracket.

According to an embodiment of the disclosure, the image capturing module further includes a substrate, where the image capturing unit is disposed at the substrate, and the color change assembly is disposed at the appearance member.

According to an embodiment of the disclosure, the color change assembly includes a light guide plate. The light guide plate includes a main body portion, an extension portion, and a connection portion. The main body portion corresponds to the opening and is parallel to the appearance member, the extension portion extends between the main body portion and the connection portion, and the connection portion is connected to the appearance member.

According to an embodiment of the disclosure, the connection portion has a step shape and extends to a position corresponding to a positioning hole of the appearance member.

According to an embodiment of the disclosure, the appearance member is a part of a housing of an electronic device.

In view of the above, in the image capturing module provided in one or more embodiments of the disclosure, the image capturing unit is disposed on the inner side of the appearance member and corresponds to the opening of the appearance member, and the color change assembly covers the opening. When the user intends to capture an image by applying the image capturing unit, the control unit controls the image capturing unit to turn on and controls the color change assembly to change to the first color. When the user no longer requires the use of the image capturing unit, the control unit controls the image capturing unit to turn off and controls the color change assembly to change to the second color. As such, the user is able to determine the operational status of the image capturing unit through the color change of the color change assembly, which is intuitive and convenient.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the embodiments of the disclosure, examples of which are illustrated in the accompanying drawings. Wherever possible, the same reference numbers are used in the drawings and the description to refer to the same or like parts.

Figure 1A:
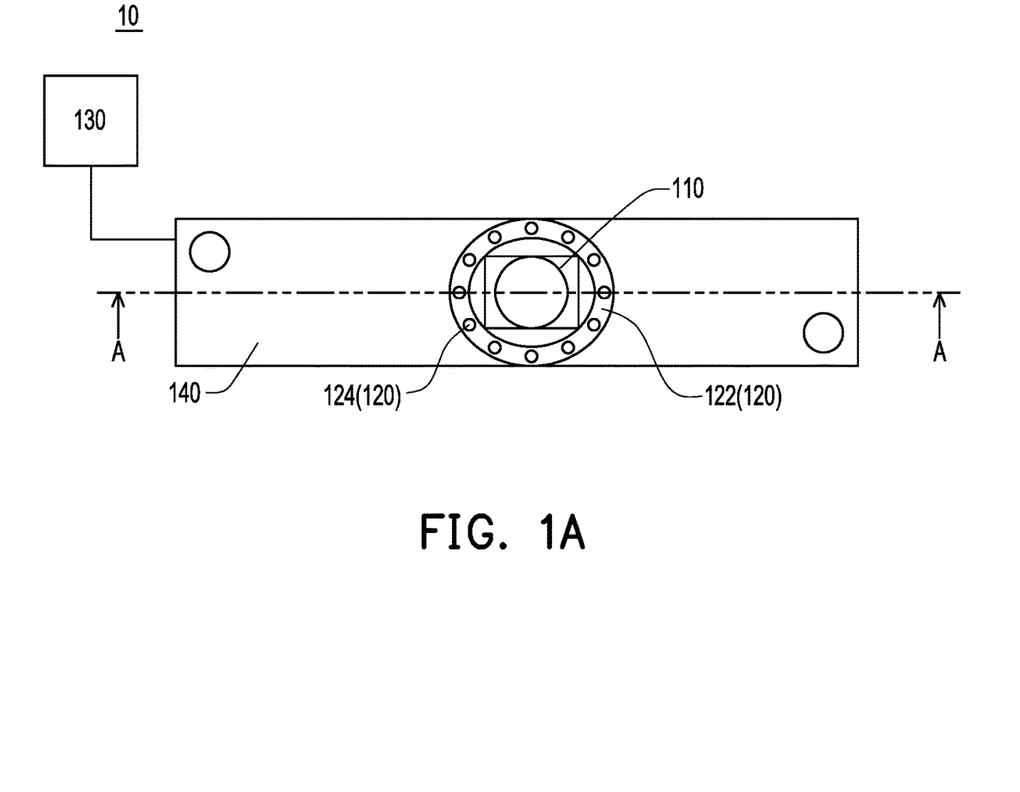
FIG. 1A is a schematic top view illustrating an image capturing module according to an embodiment of the disclosure.
Figure 1B:
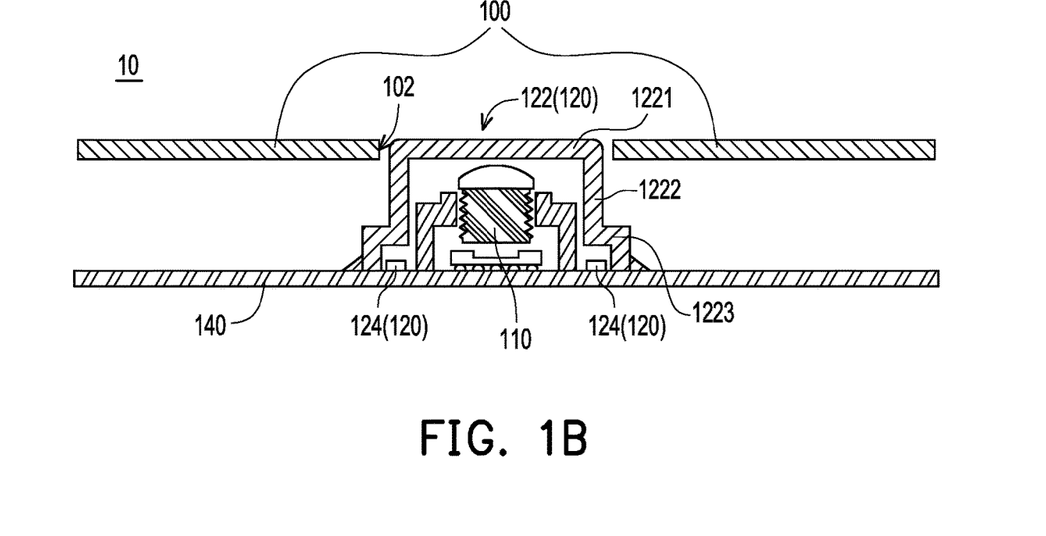
FIG. 1B is a schematic cross-sectional view illustrating the image capturing module depicted in FIG. 1A.

FIG. 1A is a schematic top view illustrating an image capturing module according to an embodiment of the disclosure. FIG. 1B is a schematic cross-sectional view illustrating the image capturing module depicted in FIG. 1A. To clearly show a color change assembly, an appearance member is hidden in FIG. 1A. With reference to FIG. 1A and FIG. 1B, an image capturing module 10 provided in this embodiment is disposed in an electronic device, which is, for instance, a laptop, a tablet computer, or a mobile phone, while the type of the electronic device should not be construed as a limitation in the disclosure.

The image capturing module 10 includes an appearance member 100 (shown in FIG. 1B), an image capturing unit 110, a color change assembly 120, and a control unit 130. The appearance member 100 is a part of a housing of the electronic device and has an opening 102 (shown in FIG. 1B). The image capturing unit 110 is, for instance, a fixed focus (FF) camera or an auto-focus (AF) camera and disposed on an inner side of the appearance member 100 and corresponds to the opening 102. The color change assembly 120 covers the opening 102. The control unit 130 is coupled to the color change assembly 120 and adapted to control the color change assembly 120 to change to a first color and a second color.

When a user intends to capture an image by applying the image capturing unit 110 (e.g., for conducting a videoconference), the control unit 130 controls the color change assembly 120 to change to the first color and turns on the image capturing unit 110. When the user no longer requires the use of the image capturing unit 110, the control unit 130 controls the color change assembly 120 to change to the second color and turns off the image capturing unit 110. Through the color change of the color change assembly 120, the user is able to clearly know the operational status of the image capturing unit 110, which will be further explained hereinafter.

As shown in FIG. 1B, the image capturing module 10 provided in this embodiment further includes a substrate 140, which is, for instance, a circuit board. The substrate 140 is located on the inner side of the appearance member 100, and the image capturing unit 110 and the color change assembly 120 are disposed at the substrate 140. The color change assembly 120 includes a light guide plate 122 and at least one light source 124. The light guide plate 122 is disposed at the substrate 140 and is arranged corresponding to the opening 102. In an embodiment of the disclosure, a surface of the light guide plate 122 is aligned with the appearance member 100. The light guide plate 122 is, for instance, secured to the substrate 140 through glue sealing or an adhesive, but how the light guide plate 122 is secured to the substrate 140 should not be construed as a limitation in the disclosure. The material of the light guide plate 122 has light transmittance, such as glass, a transparent film, or polymethyl methacrylate (PMMA). In addition, the light guide plate 122 includes a main body portion 1221, an extension portion 1222, and a connection portion 1223. The main body portion 1221 corresponds to the opening 102 and is parallel to the appearance member 100. The extension portion 1222 extends between the main body portion 1221 and the connection portion 1223, and the connection portion 1223 is connected to the substrate 140. The connection portion 1223 has a step shape to form an accommodation space on an inner side of the connection portion 1223 for accommodating the light source 124. The shape of the light guide plate 122 may be determined according to requirements for appearance design and should however not be construed as a limitation in the disclosure.

The light source 124 is, for instance, a light-emitting diode (LED) disposed at the substrate 140 and includes at least one red LED, at least one blue LED, and at least one green LED, so as to emit light of mixed colors identical or similar to the color of the appearance member 100. In other embodiments, the light source 124 may further include two red LEDs, two blue LEDs, and two green LEDs, whereas the type and the quantity of the light source 124 should not be construed as limitations in the disclosure and should depend on the actual design requirements.

In this embodiment, the light source 124 symmetrically surrounds the image capturing unit 110 and faces the light guide plate 122, so that the light source 124 is adapted to change the color of the light guide plate 122. Specifically, if the color of the appearance member is not black, when the user intends to capture an image by applying the image capturing unit 110, the control unit 130 (shown in FIG. 1A) controls the light guide plate 122 of the color change assembly 120 to change to the first color, where the first color is a transparent color. At this time, the control unit 130 further controls the image capturing unit 110 to turn on; thereby, the image capturing unit 110 is able to smoothly capture the image without being affected by the light guide plate 122, and the user may learn that the image capturing unit 110 is in an on state based on the color change assembly 120 whose color changes to the transparent color.

When the user no longer requires the use of the image capturing unit 110, the control unit 130 controls the image capturing unit 110 to turn off and controls the light source 124 to be powered on. The light source 124 emits light of the same color as the color of the appearance member 100 to the light guide plate 122 of the color change assembly 120, so as to enable the light guide plate 122 to change to the second color, where the second color is an opaque color. The user may accordingly learn that the operational status of the image capturing unit 110 is changed to an off state from the color change assembly 120 whose color changes to the opaque color.

In other words, by adjusting the color of the color change assembly 120, the user is allowed to clearly and accurately determine the operational status of the image capturing unit 110. This prevents the user from mistakenly thinking that the image capturing unit 110 is turned off when it is actually turned on, which may lead to unintentional exposure of personal images and violation of personal privacy. Moreover, the color consistency between the color change assembly 120 and the appearance member 100 enhances the overall visual appeal, providing a pleasing aesthetic experience.

The appearance member 100 is considered to have an exemplary white color, for instance. When the user intends to capture an image by applying the image capturing unit 110, the color change assembly 120 turns off the light source 124, causing the light guide plate 122 to change to the first color, which is a transparent color. When the user no longer intends to capture any image, the light source 124 changes the light guide plate 122 to the second color identical to the color of the appearance member 100, where the second color is opaque (i.e., the white color in this example). Since the color of the color change assembly 120 changes from transparent to white, the user may readily discern the change in the operational status of the image capturing unit 110 to the off state based on the appearance of the color change assembly 120. Besides, both the appearance member 100 and the color change assembly 120 visually present the white color, ensuring a consistent and aesthetically pleasing overall color effect.

On the other hand, if the color of the appearance member 100 is black, when the user intends to capture an image by applying the image capturing unit 110, the light guide plate 122 of the color change assembly 120 changes to the first color, which is a transparent color. The control unit 130 controls the image capturing unit 110 to turn on, so that the image capturing unit 110 may smoothly capture the image without being affected by the light guide plate 122, and the user may learn that the image capturing unit 110 is in the on state based on the color change assembly 120 whose color changes to the transparent color. When the user no longer intends to capture any image, the light source 124 changes the light guide plate 122 to the second color distinct from the color of the appearance member 100, where the second color is opaque. Since the color of the color change assembly 120 changes from the first color to the second color, the user is able to clearly determine from the appearance that the operational status of the image capturing unit 110 is changed to the off state. In another embodiment, when the image capturing unit 110 is turned on and off, the light source 124 is not powered on, thus keeping the color change assembly 120 in a transparent color.

In addition, the light source 124 is located outside a field of view (FOV) of the image capturing unit 110 to prevent the image capturing unit 110 from being affected by the light source 124 while the image capturing unit 110 is capturing images.

In another embodiment, the color change assembly 120 includes an e-ink assembly, which may change to the first color and the second color and has light transmittance and thus may operate in a manner the same as or similar to the manner provided in the previous embodiment.

Figure 2:
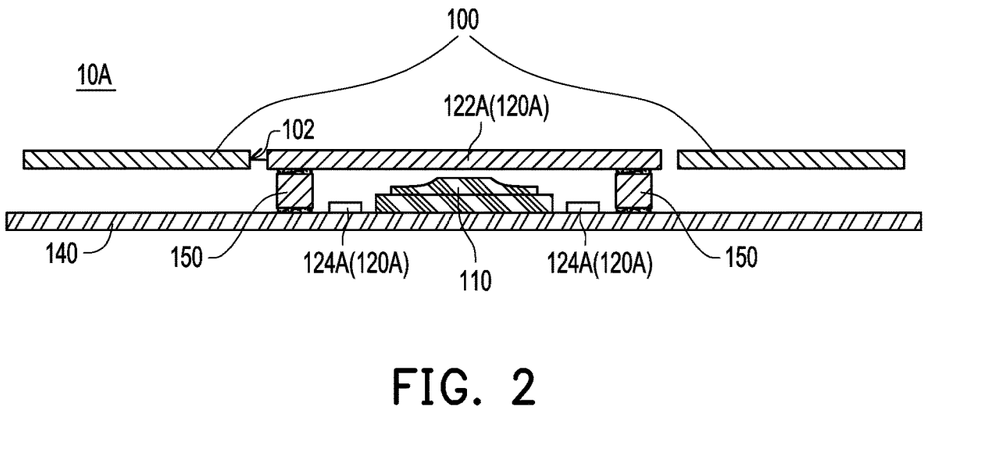
FIG. 2 is a schematic cross-sectional view illustrating an image capturing module along a sectional line A-A according to another embodiment of the disclosure.

FIG. 2 is a schematic cross-sectional view illustrating an image capturing module along a sectional line A-A according to another embodiment of the disclosure. The embodiment shown in FIG. 2 differs from the embodiment shown in FIG. 1B in that an image capturing module 10A in FIG. 2 further includes a bracket 150, and a color change assembly 120A is disposed at the substrate 140 through the bracket 150. Specifically, the bracket 150 is, for instance, adhered to the substrate 140 by glue sealing or an adhesive, and a light guide plate 122A of the color change assembly 120A is, for instance, adhered to the substrate 140 by glue sealing or an adhesive tape, so as to secure the color change assembly 120A to the substrate 140 through the bracket 150. The light guide plate 122A is planar and corresponds to the opening 102. In an embodiment of the disclosure, a surface of the light guide plate 122A is aligned with the appearance member 100. A distance between the light guide plate 122A and the substrate 140 and the shape of the light guide plate 122 may be determined according to actual design requirements and should however not be construed as limitations in the disclosure.

Figure 3:
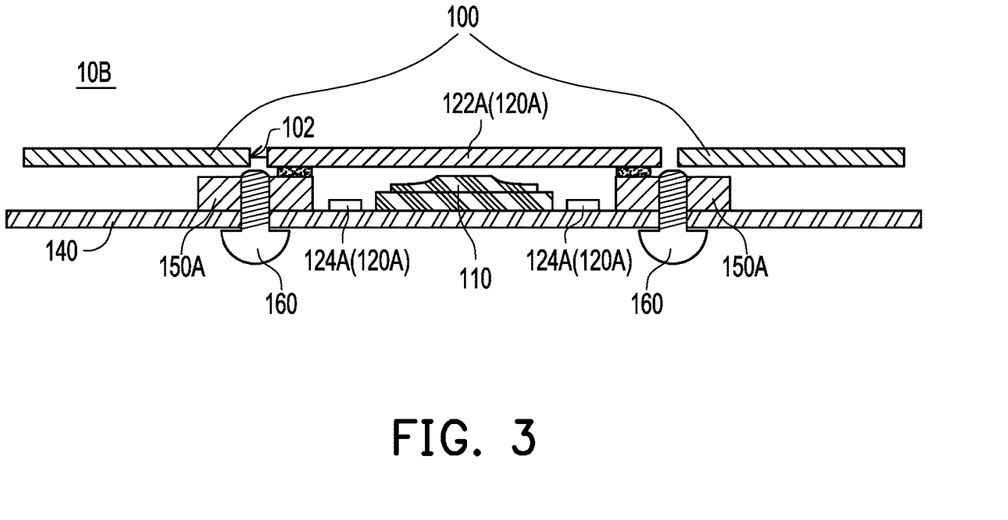
FIG. 3 is a schematic cross-sectional view illustrating an image capturing module according to another embodiment of the disclosure.

FIG. 3 is a schematic cross-sectional view illustrating an image capturing module according to another embodiment of the disclosure. The embodiment shown in FIG. 3 differs from the embodiment shown in FIG. 2 in that a bracket 150A of an image capturing module 10B in FIG. 3 is locked to the substrate 140. Specifically, the bracket 150A is locked to the substrate 140 through at least one locking member 160, such as a screw, so as to secure the bracket 150A to the substrate 140 more firmly. Similar to the embodiment shown in FIG. 2, this embodiment provides that the light guide plate 122A of the color change assembly 120A is, for instance, adhered to the substrate 140 by glue sealing or an adhesive tape, so as to secure the color change assembly 120A to the substrate 140 through the bracket 150A. The light guide plate 122A is planar and corresponds to the opening 102. In an embodiment of the disclosure, the surface of the light guide plate 122A is aligned with the appearance member 100. A distance between the light guide plate 122A and the substrate 140 and the shape of the light guide plate 122A may be determined according to actual design requirements.

Figure 4:
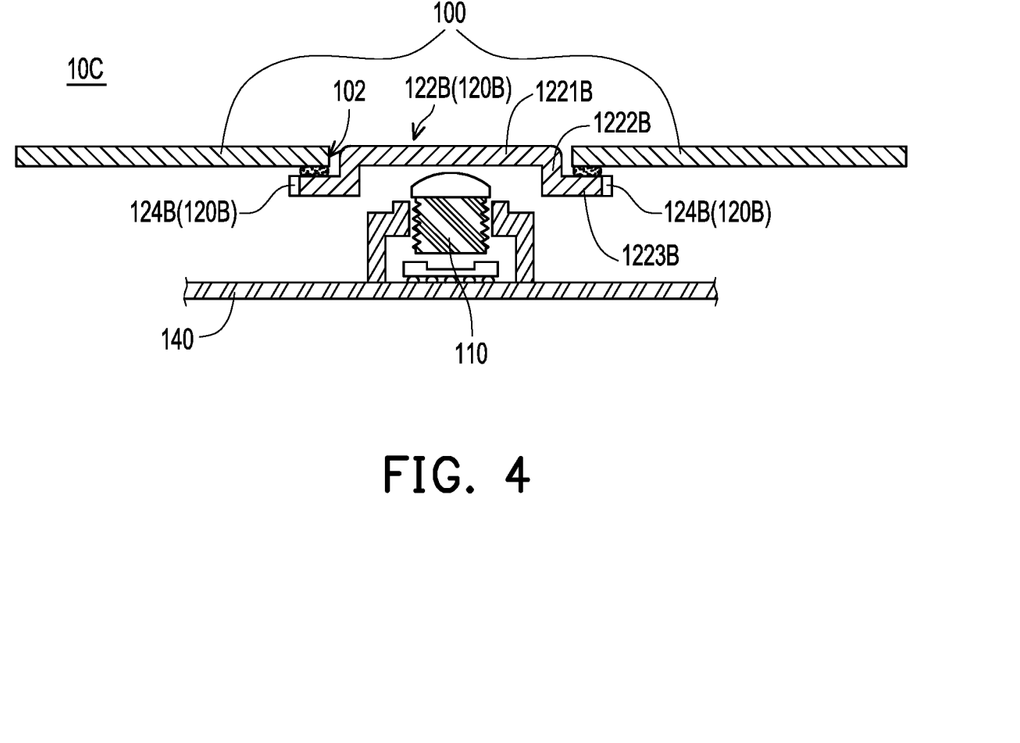
FIG. 4 is a schematic cross-sectional view illustrating an image capturing module according to another embodiment of the disclosure.

FIG. 4 is a schematic cross-sectional view illustrating an image capturing module according to another embodiment of the disclosure. The embodiment shown in FIG. 4 differs from the embodiment shown in FIG. 1B in that a color change assembly 120B of an image capturing module 10C in FIG. 4 is separated from the substrate 140. Specifically, the color change assembly 120B is adhered to the appearance member 100 by glue sealing or an adhesive tape, where a light guide plate 122B of the color change assembly 120B is disposed corresponding to the opening 102, and a light source 124B is disposed on opposite sides of the light guide plate 122B. In an embodiment of the disclosure, a surface of the light guide plate 122B is aligned with the appearance member 100. A main body portion 1221B of the light guide plate 122B corresponds to the opening 102 and is parallel to the appearance member 100, an extension portion 1222B of the light guide plate 122B extends between the main body portion 1221B and a connection portion 1223B, and the connection portion 1223B is parallel and connected to the appearance member 100. A distance between the light guide plate 122B and the substrate 140 and the shape of the light guide plate 122B may be determined according to actual design requirements. The light source 124B operates together with the circuit of the image capturing unit 110 to control a current and a voltage of the light source 124B through a light-emitting diode driver (LED driver) on the circuit of the image capturing unit 110. Functions and the operational manner of the color change assembly 120B are the same as or similar to those of the color change assembly 120 and thus will not be further described hereinafter.

Figure 5:
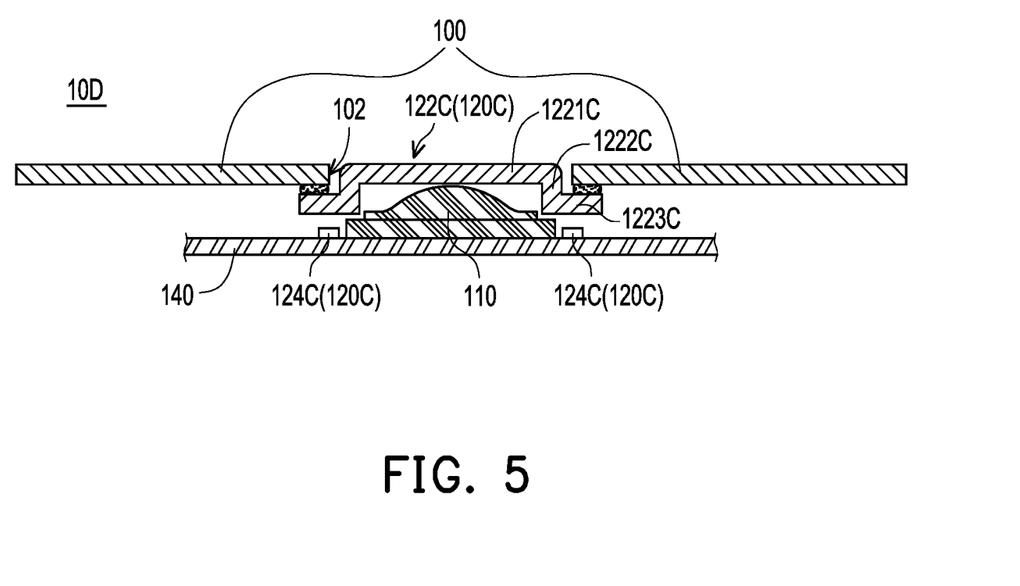
FIG. 5 is a schematic cross-sectional view illustrating an image capturing module according to another embodiment of the disclosure.

FIG. 5 is a schematic cross-sectional view illustrating an image capturing module according to another embodiment of the disclosure. The embodiment shown in FIG. 5 differs from the embodiment shown in FIG. 4 in that a light source 124C in an image capturing module 10D in FIG. 5 is separated from a light guide plate 122C of a color change assembly 120C. Specifically, the light source 124C is disposed at the substrate 140 and symmetrically surrounds the image capturing unit 110. In addition, similar to the embodiment shown in FIG. 4, this embodiment provides that the light guide plate 122C of the color change assembly 120C is, for instance, adhered to the appearance member 100 by glue sealing or an adhesive tape, and the light guide plate 122C is disposed corresponding to the opening 102. In an embodiment of the disclosure, a surface of the light guide plate 122C is aligned with the appearance member 100. A main body portion 1221C of the light guide plate 122C corresponds to the opening 102 and is parallel to the appearance member 100, an extension portion 1222C of the light guide plate 122C extends between the main body portion 1221C and a connection portion 1223C, and the connection portion 1223C is parallel and connected to the appearance member 100. Certainly, a distance between the light guide plate 122C and the substrate 140 and the shape of the light guide plate 122C may be determined according to the actual design requirements. Functions and the operational manner of the color change assembly 120C are the same as or similar to those of the color change assembly 120 and thus will not be further described hereinafter.

Figure 6:
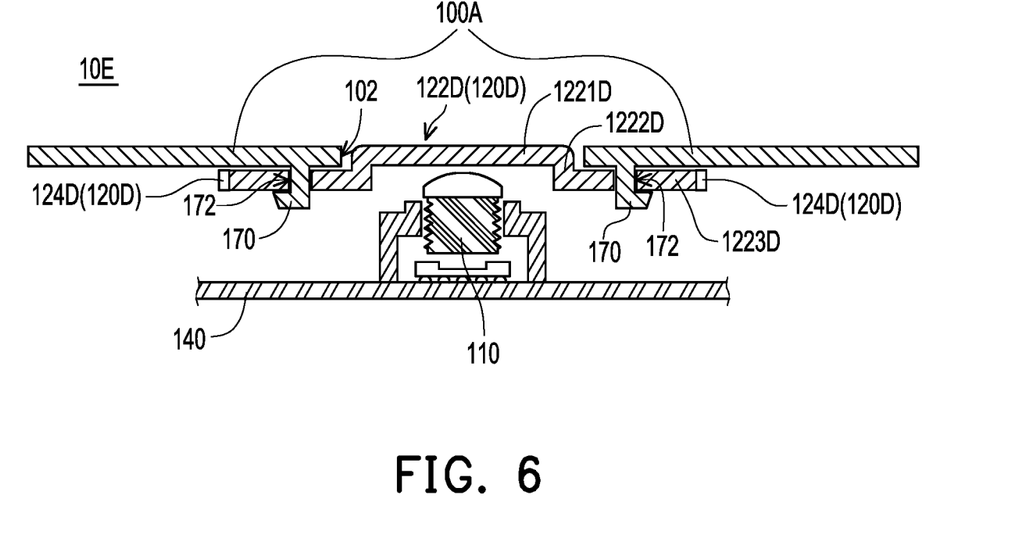
FIG. 6 is a schematic cross-sectional view illustrating an image capturing module according to another embodiment of the disclosure.

FIG. 6 is a schematic cross-sectional view illustrating an image capturing module according to another embodiment of the disclosure. The embodiment shown in FIG. 6 differs from the embodiment shown in FIG. 4 in that a color change assembly 120D in an image capturing module 10E in FIG. 6 is latched to the appearance member 100. Specifically, the appearance member 100 includes at least one latching portion 170, which is, for instance, a latching hook, a light guide plate 122D of the color change assembly 120D has at least one positioning hole 172, the latching portion 170 passes through the positioning hole 172 and latches the color change assembly 120D to the appearance member 100, so as to secure the color change assembly 120D to the appearance member 100. In addition, the light guide plate 122D is disposed corresponding to the opening 102. In an embodiment of the disclosure, a surface of the light guide plate 122D is aligned with the appearance member 100A. A main body portion 1221D of the light guide plate 122D corresponds to the opening 102 and is parallel to the appearance member 100A, an extension portion 1222D of the light guide plate 122D extends between the main body portion 1221D and a connection portion 1223D, and the connection portion 1223D is parallel and connected to the appearance member 100A. A distance between the light guide plate 122D and the substrate 140 and the shape of the light guide plate 122D may be determined according to the actual design requirements.

Figure 7:
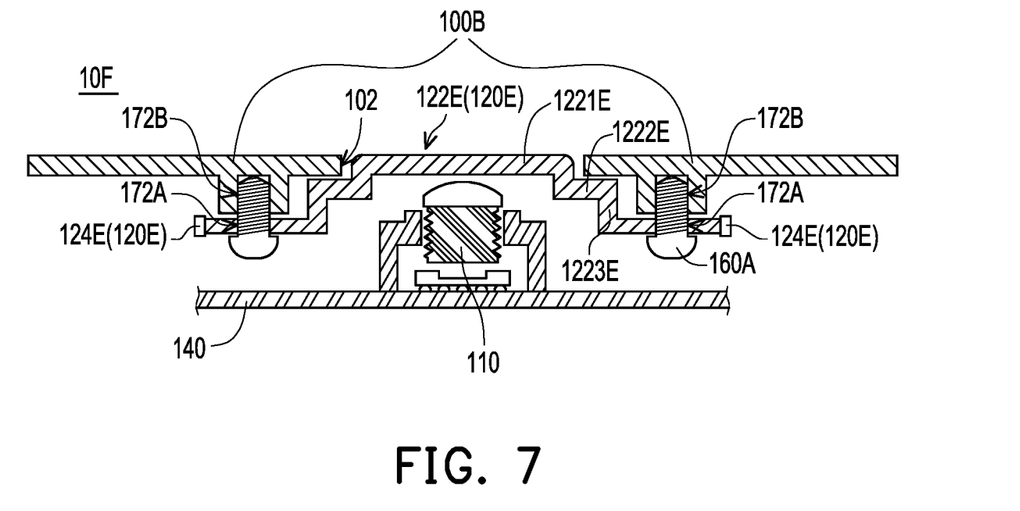
FIG. 7 is a schematic cross-sectional view illustrating an image capturing module according to another embodiment of the disclosure.

FIG. 7 is a schematic cross-sectional view illustrating an image capturing module according to another embodiment of the disclosure. The embodiment shown in FIG. 7 differs from the embodiment shown in FIG. 4 in that a color change assembly 120E in an image capturing module 10F in FIG. 7 is locked to an appearance member 100B. Specifically, the image capturing module 10F includes at least one locking member 160A, which is, for instance, a screw, the locking member 160A passes through the positioning hole 172A of the light guide plate 122E and locks the color change assembly 120E to the positioning hole 172B of the appearance member 100B, so as to secure the color change assembly 120E to the appearance member 100B. In addition, the light guide plate 122E is disposed corresponding to the opening 102. In an embodiment of the disclosure, a surface of the light guide plate 122E is aligned with the appearance member 100B. A main body portion 1221E of the light guide plate 122E corresponds to the opening 102 and is parallel to the appearance member 100B, an extension portion 1222E of the light guide plate 122E extends between the main body portion 1221E and a connection portion 1223E, and the connection portion 1223E is parallel and connected to the appearance member 100B.

Besides, the connection portion 1223E has a step shape and extends from the extension portion 1222E to a position corresponding to the positioning hole 172B of the appearance member 100B, so that the locking member 160A may pass through the positioning hole 172A of the connection portion 1223E and may be locked to the positioning hole 172B of the appearance member 100B. Certainly, a distance between the light guide plate 122E and the substrate 140 and the shape of the light guide plate 122E may be determined according to the actual design requirements.

To sum up, in the image capturing module provided in one or more embodiments of the disclosure, the image capturing unit is disposed on the inner side of the appearance member and corresponds to the opening of the appearance member, and the color change assembly covers the opening. When the user intends to capture an image by applying the image capturing unit, the control unit controls the image capturing unit to turn on and controls the color change assembly to change to the first color, which is a transparent color. When the user no longer requires the use of the image capturing unit, the control unit controls the image capturing unit to turn off and controls the color change assembly to change to the second color, which is the same color as the color of the appearance member. As such, the user is able to determine the operational status of the image capturing unit through the color change of the color change assembly, which is intuitive and convenient. Moreover, the color consistency between the color change assembly and the appearance member enhances the overall visual appeal and provides a pleasing aesthetic experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image capturing module, comprising:
    an appearance member, having an opening;
    an image capturing unit, disposed on an inner side of the appearance member and corresponding to the opening;
    a color change assembly, covering the opening; and
    a control unit, coupled to the color change assembly and adapted to control the color change assembly to change to a first color and a second color,
    wherein when the color change assembly is the first color, the control unit controls the image capturing unit to turn on, and when the color change assembly is the second color, the control unit controls the image capturing unit to turn off,
    wherein the color change assembly comprises a light guide plate and at least one light source, the at least one light source faces the light guide plate and is adapted to change a color of the light guide plate, and the at least one light source comprises a plurality of light sources symmetrically surrounding the image capturing unit.

2. The image capturing module according to claim 1, wherein the first color is a transparent color, and the second color is an opaque color.

3. The image capturing module according to claim 2, wherein the second color is identical to a color of the appearance member.

4. The image capturing module according to claim 2, wherein the second color is different from a color of the appearance member.

5. The image capturing module according to claim 1, wherein the color change assembly comprises an e-ink assembly.

6. The image capturing module according to claim 1, further comprising a substrate, wherein the image capturing unit and the color change assembly are disposed at the substrate.

7. The image capturing module according to claim 6, wherein the color change assembly comprises a light guide plate, and the light guide plate is planar and corresponds to the opening.

8. The image capturing module according to claim 6, wherein the color change assembly comprises a light guide plate, the light guide plate comprises a main body portion, an extension portion, and a connection portion, the main body portion corresponds to the opening and is parallel to the appearance member, the extension portion extends between the main body portion and the connection portion, and the connection portion is connected to the substrate.

9. The image capturing module according to claim 8, wherein the color change assembly further comprises at least one light source, the connection portion has a step shape to form an accommodation space, and the at least one light source is disposed within the accommodation space.

10. The image capturing module according to claim 6, further comprising a bracket, wherein the color change assembly is disposed at the substrate through the bracket.

11. The image capturing module according to claim 1, further comprising a substrate, wherein the image capturing unit is disposed at the substrate, and the color change assembly is disposed at the appearance member.

12. The image capturing module according to claim 11, wherein the light guide plate comprises a main body portion, an extension portion, and a connection portion, the main body portion corresponds to the opening and is parallel to the appearance member, the extension portion extends between the main body portion and the connection portion, and the connection portion is connected to the appearance member.

13. The image capturing module according to claim 12, wherein the connection portion has a step shape and extends to a position corresponding to a positioning hole of the appearance member.

14. The image capturing module according to claim 1, wherein the appearance member is a part of a housing of an electronic device.

* * * * *